(No Model.) 2 Sheets—Sheet 1.
W. EVANS.
CLIP FOR LOCOMOTIVE SPRINGS.
No. 325,202. Patented Aug. 25, 1885.
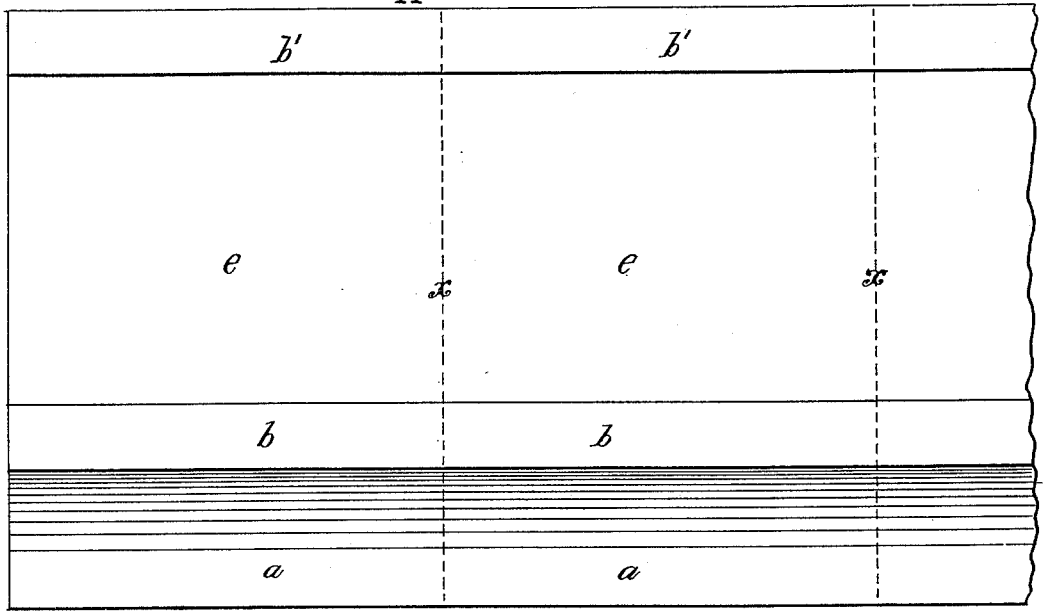
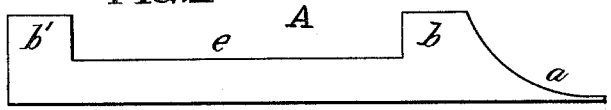
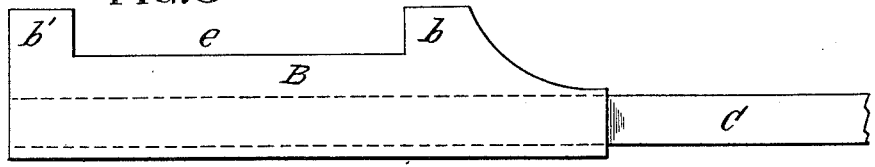
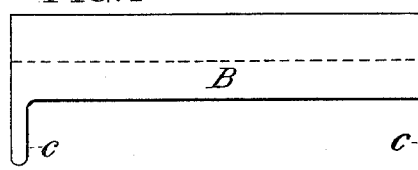
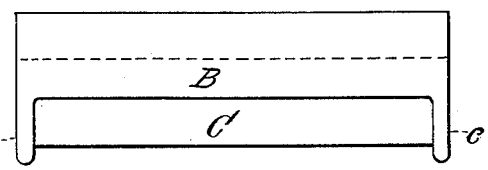
Witnesses.
J. E. W. Bewley.
W. W. Dreyfoos.
Inventor.
William Evans.
per Thomas J. Bewley, Atty.

(No Model.) 2 Sheets—Sheet 2.

W. EVANS.
CLIP FOR LOCOMOTIVE SPRINGS.

No. 325,202. Patented Aug. 25, 1885.

Witnesses.
J. E. W. Bewley.
W. W. Dreyfoos.

Inventor
William Evans.
per Thomas J. Bewley Atty

UNITED STATES PATENT OFFICE.

WILLIAM EVANS, OF PHILADELPHIA, PENNSYLVANIA.

CLIP FOR LOCOMOTIVE-SPRINGS.

SPECIFICATION forming part of Letters Patent No. 325,202, dated August 25, 1885.

Application filed August 9, 1884. (No model.)

*To all whom it may concern:*

Be it known that I, WILLIAM EVANS, a citizen of the United States, residing at Philadelphia, in the county of Philadelphia and State of Pennsylvania, have invented a new and useful improvement in Clips for forming Hook-Back Ends for Locomotive Springs, of which the following is a specification.

In forming hook-back ends for springs it has been customary heretofore to weld a square bar of steel or iron onto a plate, of which the clip is made, a short distance from one edge—say, an inch, to allow metal for welding—to form one flange, then to reheat and bend the opposite parallel edge upward for the other flange, thus making a recessed space between the two flanges for the reception of the end of a confining-bar, heat again, and weld the clip to the end of a spring-plate, thus making the process laborious and expensive.

To overcome these difficulties and form clips cheaply and expeditiously is the object of my invention; and the invention consists in passing through a pair or series of rolls a billet of iron or steel with the scarf at one side, for the purpose of furnishing material for welding, and two parallel flanges, that extend above the upper surface of the plate at right angles thereto and lengthwise of the bar, whereby a recessed space is formed on said upper surface of the bar. The object of this recessed or depressed space is to receive one end of a confining link or shackle when a clip is cut of suitable width from the length of the rolled bar, and welded by swaging-dies to the end of the upper plate of a series that form the spring.

The invention also consists in cutting clips from said rolled bar, and at the same operation "dragging" the welding-flanges on the lower surface of the plate by means of the combination of the upper and lower dies of a punching-press. By rolling the bar in a continuous piece the clips cut therefrom are uniform and easily welded, besides cheapening the cost of construction at least twenty per centum over the old method.

Figure 6:
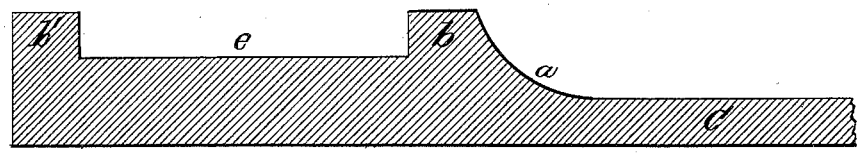
Figure 7:
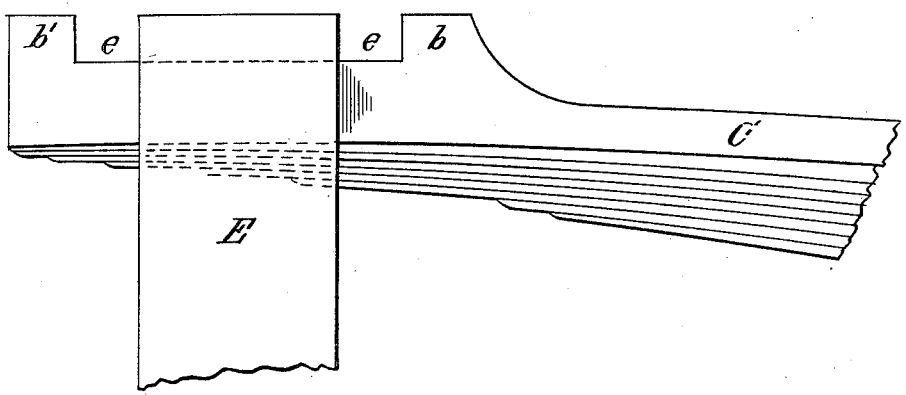
Figure 8:
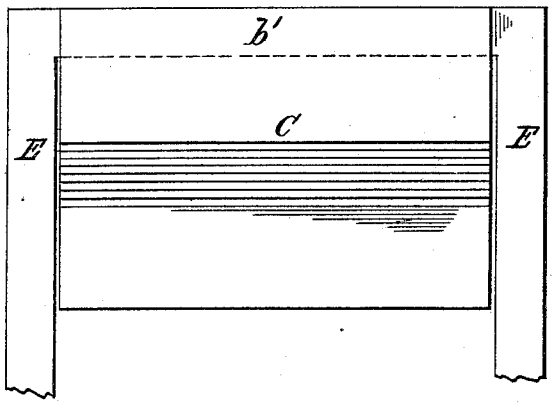

In the accompanying drawings, that make a part of this specification, Figure 1 is a face view of the upper surface of a bar of steel or iron, A, from which clips are cut after it has been passed through the rolls. Fig. 2 is an end view of the same. Fig. 3 is a side view of a clip, B, after it has been cut from the bar A, flanged on its lower surface, and laid upon the end C of a locomotive-spring plate ready for heating and welding. Fig. 4 is an end view of the clip B. Fig. 5 is an end view of the clip B and spring C in connection. Fig. 6 is a longitudinal section through a finished spring-plate end. Fig. 7 is a side view of one end of the series of plates composing the spring, with the link E in its position in the recess $e$. Fig. 8 is an end view of the same.

Like letters of reference in all the figures indicate the same parts.

A heated billet of steel or iron is at first passed through a pair or series of rolls until it assumes the shape shown in Figs. 1 and 2, with the scarf $a$ at one side and the parallel flanges $b\ b'$ extending above the surface of the plate at right angles thereto and lengthwise of the bar. The clips B are cut from said bar at the points where the dotted lines $x\ x$ cross its face, as seen in Fig. 1. The scarf $a$ then becomes the inner end of the clip. The flanges $b\ b'$ on the surface of the clip serve to form a space, $e$, for the reception of an end of the link E. (Shown clearly in Figs. 7 and 8.) The flange $b'$ may be omitted in the rolling of the bar A, in which case it is dragged up between the upper and lower dies of a punching-press. The welding-flanges $c\ c$ on the edges of the lower surface of the clips B are dragged thereon in the same manner and by similar dies as shown and described in an invention of mine for clips for the ends of locomotive-springs and in dies for forming the same, for which I have filed an application for Letters Patent on the 29th day of July, 1884, Serial No. 139,114.

A particular description of the dies and their operation is deemed unnecessary in specification. After the clip has been cut from the bar by the dies, I place it upon one end of a locomotive-spring plate, C, the scarf end $a$ inward, and the welding-flanges $c\ c$ overlapping the edges of the spring-plate C, heat the united pieces, and weld together, thus forming what is known as a "hook-back spring end."

Clips cut from the bar A are uniform in outline, and when welded to the end of the spring-plate a much better product is obtained than by the method now in use, besides greatly cheapening the cost of production.

What I claim as my invention is—

1. The bar A, of which to cut clips for forming ends of locomotive hook-back springs, having the recess $e$ and flanges $b\ b'$ rolled thereon, substantially as described.

2. The clip B, having the recessed space $e$, flanges $b\ b'$, and the welding-flanges $c\ c$, substantially as shown.

WILLIAM EVANS.

Witnesses:
THOMAS J. BEWLEY,
J. R. MASSEY.